United States Patent
Vikene et al.

(10) Patent No.: US 6,251,572 B1
(45) Date of Patent: Jun. 26, 2001

(54) PROCESS FOR PRODUCING PRINTS

(75) Inventors: Michael Vikene, Küssaberg (DE); Frank Löffel, Zürich (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 09/504,383

(22) Filed: Feb. 15, 2000

(30) Foreign Application Priority Data

Feb. 15, 1999 (EP) .................................................. 99101781

(51) Int. Cl.$^7$ ....................................................... G03E 5/08
(52) U.S. Cl. .............................................. 430/403; 355/40
(58) Field of Search ............................... 430/403; 355/40

(56) References Cited

U.S. PATENT DOCUMENTS

| | | | |
|---|---|---|---|
| 4,647,190 | 3/1987 | Nitsch et al. | 355/55 |
| 4,737,825 | 4/1988 | Davis | 355/54 |
| 5,212,512 | 5/1993 | Shiota | 354/319 |
| 5,748,286 | * 5/1998 | Schindler et al. | 355/40 |

FOREIGN PATENT DOCUMENTS 0 602 715A2   6/1994  (EP) .

* cited by examiner

Primary Examiner—Hao Van Le
(74) Attorney, Agent, or Firm—Burns, Doane, Swecker & Mathis, LLP

(57) ABSTRACT

Prints of different formats are produced by pixel by pixel recording of image information available in digital form for each picture onto a carrier material from a group of band-shaped standard carrier materials having different preselected strip widths. The image information of a print is recorded in a normal orientation or rotated 90° when one of the dimensions of the print to be produced can be made to correspond with the strip width of the available carrier material. The carrier material is changed when neither the length nor the width of a print to be produced corresponds to the strip width of the available carrier material. For a set of pictures to be produced which have at least partially different formats, the sequence of the recording of the underlying picture information is set according to the formats of the prints to be produced so that the number of the required carrier material changes is minimized. The prints are thereby assigned according to their format to width classes which correspond to the different length and width values of the print. The frequencies of the different length and width values of the prints are determined and prints are respectively assigned the individual width classes which have a length or width corresponding to the value of the respective width class, whereby the assignment to one width class is carried out by ranking of the frequency of the value corresponding to the width class. The prints are then recorded by width class onto a standard carrier material corresponding to the respective width class.

12 Claims, 1 Drawing Sheet

PROCESS FOR PRODUCING PRINTS

FIELD OF THE INVENTION

The invention relates to a process for the manufacture of prints, in particular photographic prints of different format.

BACKGROUND ART

Standardized print formats and copier material of different standardized width is generally used for the manufacture of photographic copies, independent of the respectively used technology.

In so-called analog minilabs which operate with conventional illumination, the pictures are one after another projected onto the photographic copier material in the sequence of the image originals on the strip of negatives. Prerequisite for the production of a print of a desired format is the availability of a copier material of corresponding width in the copier. When the required print format cannot be achieved with the copier material axially available in the copier, a copier material change must be carried out by the operating personnel.

An additional degree of freedom results in so-called digital minilabs which produce prints by recording (exposure, printing) image information present in digital form pixel by pixel onto a suited carrier material (photographic or print paper). These apparatus also permit the recording of the image information onto the carrier material in an orientation rotated by 90° from a normal orientation, so that one and the same carrier material can be used when either the length or the width of the print format to be manufactured corresponds to the width of the carrier material. However, when that is not the case, a change of carrier material is also required.

A change of the carrier material generally requires the interruption of the print production process and thereby reduces the productivity of the print-producing apparatus (copier). The time required for the processing of a number of prints is determined by the number of carrier material changes which must be carried out by the operating personnel. As soon as the further processing requires print formats which cannot be achieved with the axially available carrier material, the processing is again interrupted because of the newly required carrier material change.

SUMMARY OF THE INVENTION

The present invention is now intended to improve a print-manufacturing process of the generic type in such a way that a faster processing of an order and thereby a higher productivity can be achieved. In particular, the unproductive phases caused by the required changes of the carrier material are to be reduced as well as the stress and attendance time of the operating personnel for the print producing apparatus.

BRIEF DESCRIPTION OF THE DRAWINGS

The above objects and features of the present invention will be more apparent from the following description of the preferred embodiments with reference to the accompanying drawings, wherein.

DETAILED DESCRIPTION OF THE PREFERRED EMBODIMENT

Figure 1:
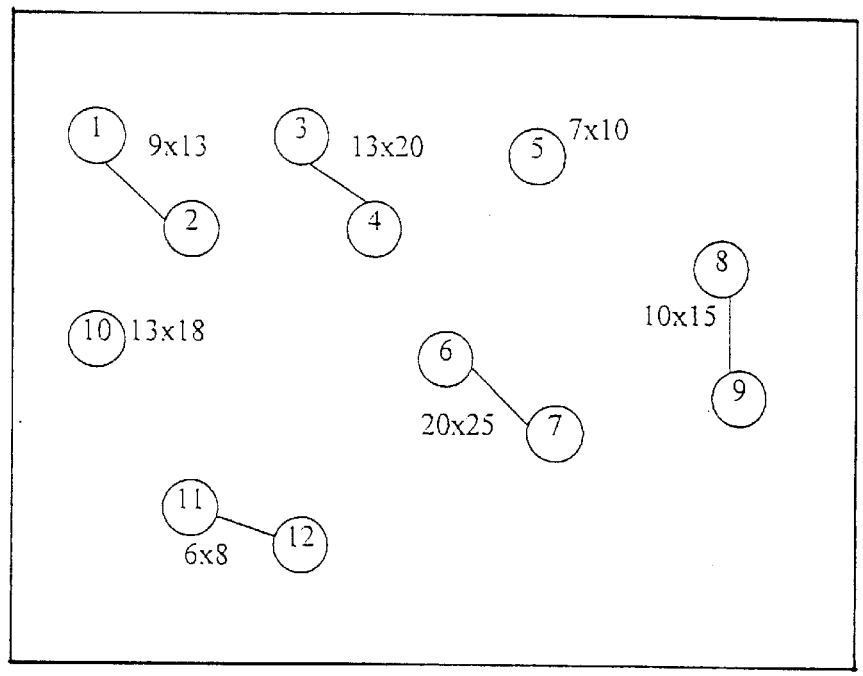
FIG. 1 illustrates an exemplary set formats for photographic prints.

Band-shaped recording materials (carrier material) of standardized widths is normally used in photofinishing which either before or after the image recording is cut into individual sheets of a length corresponding to the formats of the prints to be manufactured. In the following, standard carrier materials refers to these carrier materials of standardized widths. In order to achieve a distinction in terminology to the width of the normally rectangular prints to be produced, the width of the carrier material (cut or uncut) used for the recording of the images is hereinafter called strip width. The print formats used in the manufacture of photographic images are in general rectangular and are normally also standardized. The formats are normally (but not necessarily) adapted to the standard carrier materials so that their length or width corresponds to the strip width of a standard carrier material. In accordance therewith, two prints are in the following referred to as having equal width when one format dimension (length or width) of one print corresponds with any one format dimension of the other print.

Assuming, for example, an extremely heterogeneous copying order for illustration purposes includes a relatively small set of 12 prints to be produced with at total of seven different formats according to the following Table 1:

TABLE 1

| Print No. | Format (cm) |
| --- | --- |
| 1 | 9 × 13 |
| 2 | 13 × 20 |
| 3 | 7 × 10 |
| 4 | 20 × 25 |
| 5 | 10 × 15 |
| 6 | 13 × 18 |
| 7 | 6 × 8 |
| 8 | 9 × 13 |
| 9 | 13 × 20 |
| 10 | 13 × 18 |
| 11 | 20 × 25 |
| 12 | 9 × 13 |

If these prints were manufactured with a conventional, analog copier apparatus and in a conventional manner, which means in the sequence of their numbering, a total of 11 or 12 changes of the copier material (generally carrier material) would be required, depending on whether not the strip width of the copier paper in the copier apparatus at the onset of the copying process is 9 or 13 cm. When a digital copier apparatus is used which also allows the recording of image information rotated by 90°, 8 to 9 changes of the copier paper would be required with conventional sequential processing, depending on whether or not the width of the copier paper in the copier apparatus at the onset of the copying process is 13 cm. As will be apparent from the following, the number of the required copier paper changes is reduced by the process in accordance with the invention in its most common form wherein no rotated recording is permitted, to 6 or 7 changes with the same set of prints to be manufactured, depending on the strip width of the copier paper available at the outset. In a preferred embodiment of the process in accordance with the invention with digital recording and available rotated recording of the images, the number of the required carrier material changes is reduced even further to 3 or 4, depending on whether or not the strip width of the copier paper in the copier apparatus at the onset of the copying process is 13 cm. With a set of prints to be produced which in reality is normally much more voluminous, the reduction of the required copier paper changes is even more pronounced compared to the conventional manufacturing processes, at least with highly heterogeneous orders (sets), which means orders including many different print formats.

In accordance with the principal process of the present invention, the recording of images is no longer carried out sequentially in the sequence of their numbering or their location on the strip of negatives at hand, but is optimized in such a way that the number of the required carrier material changes is reduced to a minimum by adjusting the sequence of the manufacture of the individual prints, which means the sequence of the individual exposure processes, or of the recording of the image information present in stored, digital form and forming the basis of the images, onto a carrier material corresponding to the digital recording technology used.

According to the principle of the invention, this optimization is achieved by sorting the prints to be produced into so-called width classes and carrying out the recording thereof onto the carrier material by width class, whereby a carrier material of a different strip width is used for each width class including at least one image. The recording sequence within one width class is arbitrary.

In the most general form of the process in accordance with the invention, which is also suited for conventional analog recording apparatus (copier apparatus), the width classes simply result from the different image formats present in the set of the prints to be produced. All prints of equal format are assigned to the corresponding width class and the recording process (exposure or copying process) is then simply carried out in such a way that respectively all prints of one width class are recorded one after another and then those of the next width class and so on, until all images are recorded. The sequence of the width classes per se is not critical, however, if applicable, one should start with the width class which corresponds to the strip width of the actually available carrier material and end with the width class which from experience will probably also occur in the following set of prints to be produced.

The preferred embodiment of the process in accordance with the invention described in the following is based on the presumption that the image information of the prints to be produced is stored in digital form for each image and that a modern, pixel wise operating recording apparatus, for example, a so-called digital minilab, is used for the image recording, which is able to record images on the carrier material in a defined orientation as well as in an orientation rotated by 90° relative thereto. The length and width dimensions of a print format thereby become of equal importance and prints of the same width can be recorded on one and the same carrier material.

In this embodiment of the process in accordance with the invention the optimization of the print manufacturer's sequence is also achieved by sorting the prints to be produced into so-called width classes and carrying out the recording onto the carrier material by width class, whereby carrier material of a different strip width is needed for each width class including at least one print. The recording sequence within a width class is here also arbitrary. In this embodiment, the association of the prints with the width classes is carried out in such a way that as few occupied width classes as possible are created or remain. The problem of optimising the recording sequence of the prints is thereby reduced to optimising the assigning of the prints to the width classes. The sequence of the width classes is arbitrary, however, can also still be optimized with respect to additional marginal conditions. This will be dealt with further below.

In a first step, all those pictures of a set of prints to be produced are determined which have the same length or width as the strip width of the carrier material actually available in the recording apparatus. Those prints of equal width are assigned to a width class corresponding to the strip width of the actually available carrier material. They can be produced immediately, which means without carrier material change and are either immediately recorded, or their width class is reserved as a width class to be recorded first, if the recording is to be started at a later point in time, for example, after completion of the assignment of the remaining prints. After this step, pictures remain which can be only produced after a carrier material change, i.e. those prints for the recording of which one or more carrier material changes are required. To illustrate the following steps of the process in accordance with the invention, we assume that 12 prints remain with the formats listed in the following Table 2.

Figure 2:
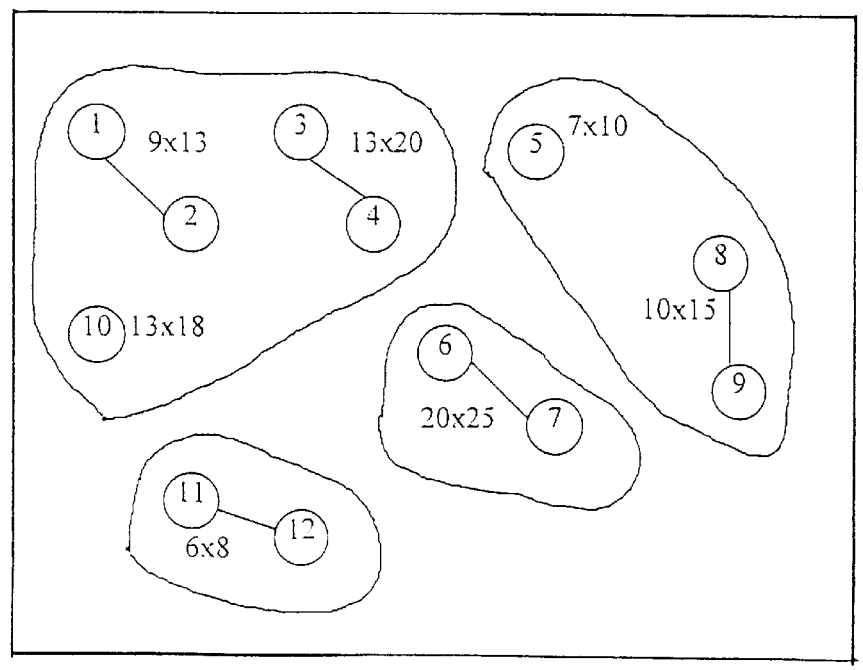
FIG. 2 illustrates the prints of FIG. 1 organized according to a common dimension.

FIG. 2 graphically illustrates this situation. (The similarity of the number values in Table 2 with those in Table 1 is arbitrary and irrelevant for the following.)

TABLE 2

| Print No. | Format (cm) |
| --- | --- |
| 1,2 | 9 × 13 |
| 3,4 | 13 × 20 |
| 5 | 7 × 10 |
| 6,7 | 20 × 25 |
| 8,9 | 10 × 15 |
| 10 | 13 × 18 |
| 11,12 | 6 × 8 |

In order to sort these 12 prints in optimal manner into width classes, the frequencies of the different length and width values occurring among the 12 prints are initially determined. This is illustrated in the following Table 3:

TABLE 3

| | Occurring Length and Width (cm) | | | | | | | | |
| --- | --- | --- | --- | --- | --- | --- | --- | --- | --- |
| Print No. | 6 | 7 | 8 | 9 | 10 | 13 | 15 | 18 | 20 | 25 |
| 1,2 | | | | x | | x | | | | |
| 3,4 | | | | | | x | | | x | |
| 5 | | x | | | x | | | | | |
| 6,7 | | | | | | | | | x | x |
| 8,9 | | | | | x | | x | | | |
| 10 | | | | | | x | | x | | |
| 11,12 | x | | x | | | | | | | |
| Frequency | 1 | 1 | 1 | 1 | 2 | 3 | 1 | 1 | 2 | 1 |

As is apparent, in this example a total of ten different values are present for the length and width of the remaining 12 prints to be produced. Accordingly, there are ten different width classes. Some values (dimensions) occur more often than others. According to a further important aspect of the invention, the assignment of the prints to the possible width classes is carried out according to the ranking of the frequencies of the occurring values. For example, the value 13 has the highest frequency so that initially all prints with a width or length of 13 cm are assigned to the width class 13. For the remaining prints, the value 10 has the highest frequency so that all prints with a length or width of 10 cm are assigned to the width class 10. This process is continued until all prints are assigned to a width class. When the frequencies are the same for two values, the assignment can be arbitrary. As a result, one obtains, for example, an assignment of the 12 prints into a total of only four width classes according to the following Table 4:

| Width Class | Assigned Prints |
|---|---|
| 13 | 1,2,3,4,10 |
| 10 | 5,8,9 |
| 20 (25) | 6,7 |
| 6 (8) | 11,12 |

FIG. 2 graphically illustrates the assignment of the 12 prints to the four width classes.

After completed assignment of the prints to the appropriate width classes, the recording of the image information on to the carrier material can be commenced, whereby one can start with any width class. However, the sequence of the width classes is preferably selected such that the statistically most frequent one of the width classes present is processed last in order to increase the probability of an advantageous final position for a subsequent print production cycle. If the width classes of the prints of a subsequent production cycle are already known, it is advantageous to process that width class last, if present, which also occurs in the subsequent production cycle. This will save another carrier material change.

Of course, the process in accordance with the invention can be carried out by way of an appropriately programmed computer. The implementation of the process as acomputer programme is relatively easily carried out for the person skilled in the art and does not require any substantial cost.

The number of the required carrier material changes is minimized by the process in accordance with the invention. A significant acceleration of the print production process with different print formats is hereby achieved. At the same time, the operating personnel for the recording apparatus is relieved and the time periods in which the operating personnel must be on site reduced. The process in accordance with the invention is especially advantageously used in such digital recording apparatus which are able to store several print production orders and operate quasi-synchronously. It is thereby possible to either optimize the print sequence over several orders or to record the prints of equal width classes from different orders in one sequence.

The process in accordance with the invention was above described by way of example only and for ease of understanding in connection with an analog or digital minilab. However, it is understood that the process in accordance with the invention can also be used in a modem, especially digital high-power copier apparatus (digital high speed printer).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Process for the manufacture of rectangular prints having one of a plurality of different width formats by recording image information present for each image onto at least one of a band-shaped and a sheet-type carrier material of a group of carrier materials with different preselected strip widths, wherein a change of carrier material is carried out when the format of a print to be produced does not correspond to the strip width of a current carrier material, and wherein a new carrier material resulting from the change has a width corresponding to the print to be produced and different from the previous carrier material, said process comprising the step of: setting a sequence for recording the underlying image information onto the carrier materials with the different preselected strip widths so that the number of the carrier material changes required due to the different formats is minimized.

2. A process according to claim 1, wherein the prints corresponding to the set of prints to be produced are individually assigned to width classes according to a width format, and the recording of the prints is carried out by width class.

3. A process according to claim 1, wherein an underlying image information for the prints to be produced is present in digital form and is recorded onto the carrier material pixel by pixel, and image information of a print is recorded in at least one of a preselected normal orientation and rotated 90° with respect to said normal orientation, when at least one dimension of the respective print to be produced can be made to correspond with the strip width of the carrier material that is actually available.

4. A process according to claim 3, wherein each print of the set of prints to be produced is assigned, according to a format to which said print corresponds, to one of a number of width classes corresponding to preselected strip widths of the standard carrier materials, wherein a print is assigned to a width class when at least one of a length and a width of the print corresponds with the strip width of the standard carrier material of the respective width class, the prints being recorded by width class onto the standard carrier material of the respectively width class.

5. A process according to claim 4, wherein a plurality of prints having a length or width corresponding to the strip width of the available carrier material is produced initially and the remaining prints of the set are assigned to the width classes corresponding to one of remaining standard carrier materials.

6. A process according to claim 4, wherein the assignment to a width class is carried out according to a ranking of the frequency of different actually occurring length and width values of the prints to be produced.

7. A process according to claim 3, wherein a plurality prints from a set of prints to be produced are assigned, according to format, to width classes which correspond to different length and width values of the prints, the frequency of the different length and width values of the prints is determined, prints are assigned to individual width classes which have a length or width corresponding to a value of the respective width class, wherein the assignment to a width class is carried out by ranking of the frequency of the value corresponding to the width class, and the recording of the image information of the pictures to be produced is carried out by width class, wherein all prints assigned to one width class are produced directly one after another.

8. A process according to claim 7 wherein a plurality of prints having a length and width corresponding to the strip width are produced initially and a remaining set of prints are subsequently assigned to further width classes.

9. A process according to claim 3, wherein assignment of the prints to width classes is carried out in order to minimize a total number of width classes to which prints are assigned.

10. A process according to claim 3, wherein image information of prints which belong to the width class corresponding to actually available carrier material are recorded first.

11. A process according to claim 3, wherein image information of prints having a width class with the highest frequency is recorded last.

12. A process according to claim 3, wherein image information of prints having a width class represented in the subsequent set of prints to be produced is recorded last.

* * * * *